United States Patent
Diekhaus et al.

(10) Patent No.: US 7,789,649 B2
(45) Date of Patent: Sep. 7, 2010

(54) DEVICE FOR EXTRUDING HOLLOW STRANDS

(75) Inventors: Brigitte Diekhaus, Bielefeld (DE); Jörg Schmuhl, Königs Wusterhausen (DE)

(73) Assignee: Inoex GmbH, Bad Oeynhausen (DE)

( * ) Notice: Subject to any disclaimer, the term of this patent is extended or adjusted under 35 U.S.C. 154(b) by 250 days.

(21) Appl. No.: 11/976,498

(22) Filed: Oct. 25, 2007

(65) Prior Publication Data

US 2008/0131542 A1  Jun. 5, 2008

(30) Foreign Application Priority Data

Oct. 25, 2006 (DE) .................. 10 2006 051 104

(51) Int. Cl.
*B29C 47/90* (2006.01)
(52) U.S. Cl. .................. 425/326.1; 425/71; 425/378.1; 425/379.1; 425/380; 425/467
(58) Field of Classification Search .................. 425/71, 425/326.1, 378.1, 379.1, 380, 466, 467
See application file for complete search history.

(56) References Cited

U.S. PATENT DOCUMENTS 3,981,663 A * 9/1976 Lupke ............. 425/326.1
4,545,751 A   10/1985 Lupke
6,551,534 B1 * 4/2003 Kirjavainen et al. ...... 264/37.17

FOREIGN PATENT DOCUMENTS

DE     697 13 645 T2     12/2002
DE   10 2005 002 820 B3  11/2006
DE   10 2005 031 747 A1  11/2007

OTHER PUBLICATIONS

Holman, J. P., Heat Transfer 7th Edition, 1990, McGraw-Hill Publishing Company, pp. 29-30.*
German Office Action dated Jun. 18, 2007 in German Application No. 10 2006 051 104.2-16, filed Oct. 25, 2006 (2 pages).

* cited by examiner

*Primary Examiner*—Yogendra N Gupta
*Assistant Examiner*—Joseph Leyson
(74) *Attorney, Agent, or Firm*—Shlesinger, Arkwright & Garvey LLP

(57) ABSTRACT

Device for extruding hollow strands from thermoplastic material, with an extruder head, having a mandrel, and a calibrating device, for making a dimensional change while production is in progress, and with a radially adjustable inlet, at least one Ranque vortex chamber being formed in the mandrel, the cooling air outlet of which chamber leads into a cooling tube, which extends as an axial extension of the mandrel through the inlet of the calibrating device and has a cooling air outlet opening out into the calibrating device. This device achieves the object of providing a device with which effective interior cooling is achieved in calibrating devices designed for making a dimensional change while operation is in progress.

8 Claims, 2 Drawing Sheets

DEVICE FOR EXTRUDING HOLLOW STRANDS

CROSS-REFERENCE TO RELATED APPLICATIONS

This application claims the priority of German application no. 10 2006 051 104.2, filed Oct. 25, 2006, and which is incorporated herein by reference.

FIELD OF THE INVENTION

The present invention relates to a device for extruding hollow strands from thermoplastic material.

BACKGROUND OF THE INVENTION

In DE 697 13 645 T2, a device for cooling the interior of a hollow profile, in this case a plastic pipe, by means of cooling air is described. For this purpose, a hollow cylinder that is closed at the front is pushed into the hollow mandrel of an extruder head and protrudes into the following calibrating unit, an annular gap remaining between the outer wall of the hollow cylinder and the inner wall of the extruded pipe. The hollow cylinder is double-walled and is supplied with cooling water through a central feed line, which opens out into the front end wall of the hollow cylinder. This cooling water flows from its inlet point in the front end wall of the hollow cylinder radially outwards and then back through the cylindrical double casing to the extruder head. In the region of the mandrel, the double casing is bent conically inwards and comes to lie against the circumference of the central cooling water feed line. The cooling air is blown into the hollow cylinder in the direction of extrusion and deflected outwards at the cone formed by the double casing onto the wall of the hollow cylinder. Provided there are through-openings, through which the cooling air flows into the annular gap. There it passes over the inner wall of the extruded pipe and cools it down. The heat taken up by the cooling air is removed again, at least partially, by the cooling water flowing in counterflow in the double casing, so that the cooling air can remove heat from the extruded pipe over the entire length of the annular gap.

In U.S. Pat. No. 4,545,751, a device for cooling the interior of a corrugated tubing produced on an extrusion line is described. Screwed as an extension onto the mandrel of the extruder head of this device is a housing, which reaches into a peripheral mould for creating the corrugation of the tubing to be produced. Arranged in the housing is a Ranque vortex chamber, the cooling air outlet of which opens out into the housing. The latter has in turn radial outlet openings, through which the cooling air flows into the extruded hollow strand lying against the mould and cools it from the inside.

For some years, equipment that makes it possible to change the dimensions of an extruded plastic profile while the production process is in progress has been available. This includes calibrating sleeves, the cross section of which can be changed within relatively wide limits and which have an inlet that can is radially adjustable to match the changing cross section. Such a calibrating sleeve is described in DE 10 2005 002 820 B3.

In particular on account of their radial dimensions, the prior-art devices for cooling the interior of extruded hollow strands in a calibrating device described at the beginning cannot be used in calibrating devices designed for making a dimensional change while operation is in progress, in particular in the case of small cross sections of the hollow strands.

This also applies to a device for extruding hollow strands from thermoplastic material that is disclosed in the subsequently published DE 10 2005 031 747 A1. This has, inter alia, an extruder head with a mandrel and also a calibrating device. Formed in the mandrel is a least one Ranque vortex chamber, the cooling air outlet of which leads into the interior space of the extruded hollow profile.

OBJECTS AND SUMMARY OF THE INVENTION

The object of the present invention is to remedy this situation and provide a device with which effective interior cooling is achieved in calibrating devices designed for making a dimensional change while operation is in progress.

This object is achieved according to the invention by a device for extruding hollow strands from thermoplastic material, including an extruder head having a mandrel, and a calibrating device, for making a dimensional change while production is in progress, and with a radially adjustable inlet. At least one Ranque vortex chamber being formed in the mandrel, a cooling air outlet of which chamber leads into a cooling tube, which extends as an axial extension of the mandrel through the inlet of the calibrating device and has a cooling air outlet opening out into the calibrating device.

The present invention uses the known phenomenon of the Ranque vortex tube to provide a simple way of producing a cooling gas which is used for cooling the interior of an extruded hollow strand. In this case, the vortex tube does not require any additional space ahead of the extrusion die, since it is situated in its mandrel. There, the hot air generated in the vortex tube can also be meaningfully used, for example by the mandrel being additionally heated. Cooling gas produced in the vortex tube is transferred via the cooling tube, to a certain extent as with an injection needle, into the calibrating device and is available there for effective interior cooling. Since the cooling tube only has to be designed in its cross section for the amount of cooling gas to be transported, its radial dimensions can be kept small, so that it does not hinder the radial adjustment displacements of the calibrating device that are required in the case of a dimensional change, or make them impossible.

Further advantageous refinements of the invention are provided as set forth in detail herein, such as below, and in the claims and abstract.

The invention is explained in more detail below on the basis of exemplary embodiments of a pipe extrusion line.

Relative terms, such as left, right, up, and down, are for convenience only, and are not intended to be limiting.

DETAILED DESCRIPTION OF THE INVENTION

Figure 1:
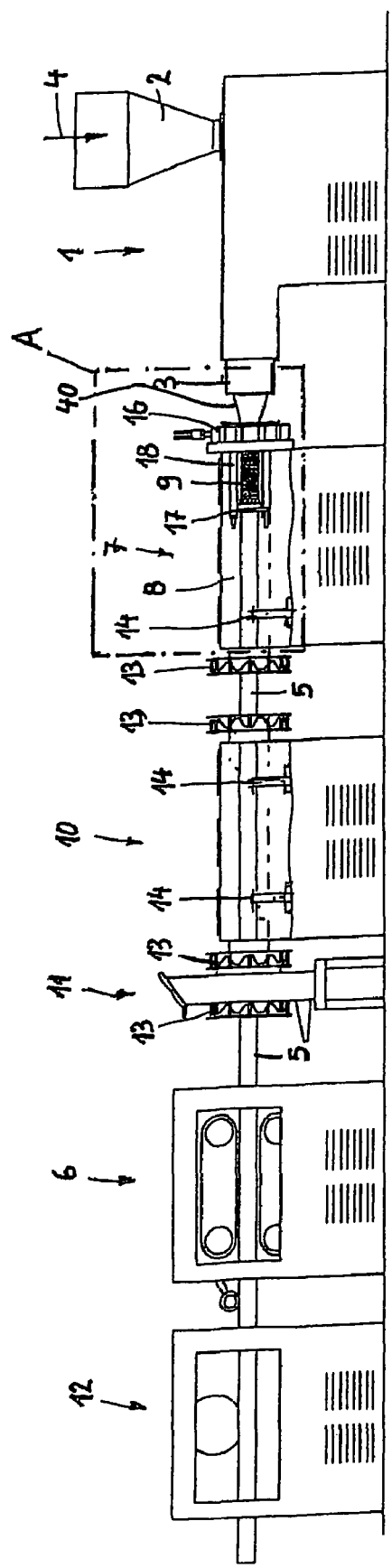
FIG. 1 shows a schematic side view of an extrusion line.

The extrusion line for producing pipes that is represented in FIG. 1 comprises an extruder unit 1 with a feed hopper 2, an extruder screw, which cannot be seen in the drawing, and a pipe extrusion head 3. A thermoplastic material 4 in the form of granules or powder is fed to the extruder unit 1 via the feed hopper 2. In this extruder unit, the granules or powder is/are heated, kneaded and plasticated. Subsequently, the plastic 4 is conveyed as a mouldable compound by the extruder screw into the pipe extrusion head 3 and forced there through an annular gap 15 (see FIGS. 2 to 4).

After emerging from the annular gap 15, the hot, still deformable pipe 5 is drawn by means of a tracked take-off unit 6, arranged at the end of the extrusion line, through a calibrating and cooling unit 7, which has a vacuum tank 8 with a calibrating sleeve 9 arranged at its inlet. The calibrating sleeve 9 is infinitely variable in diameter, so that the extruded, still mouldable pipe 5 can be fixed to the desired outer diameter. After leaving the calibrating and cooling unit 7, the pipe 5 enters a cooling zone 10, in which it is cooled down to room temperature. Arranged between the cooling zone 10 and the tracked take-off unit 6 is an ultrasonic scanner 11, with which the diameter and the wall thickness of the extruded pipe 5 are recorded. The tracked take-off unit 6 is adjoined by a separating saw 12, in which the pipe 5 is cut to length. To maintain a negative pressure in the calibrating and cooling unit 7, the cooling zone 10 and the ultrasonic scanner 11, seals 13 are provided, enclosing the pipe 5 running through with a sealing effect.

Since the extruded pipe 5 is only cured, i.e. becomes dimensionally stable, after it leaves the cooling zone 10, before that it must be supported to avoid it sagging and thereby deforming. For this purpose, two pipe supports 14 are provided in the cooling zone 10 and one is provided in the calibrating and cooling unit 7.

The calibrating sleeve 9 has an annular inlet head 16 and an annular outlet head 17. While the inlet head 16 is arranged outside the vacuum tank 8, the outlet head 17 is in the vacuum tank 8 (FIG. 1). The outlet head 17 has a fixed inner diameter, which corresponds at least to the greatest pipe diameter to be handled in the extrusion installation. It can be displaced with respect to the fixed inlet head 16 in the axial direction of the calibrating sleeve 9, in order to change its diameter. For this purpose, at least two spindle units 18 are provided, the threaded spindles of which are motor-driven.

The inlet head 16 has radially adjustable segments 19 (FIGS. 2 to 9), which are arranged uniformly over the circumference of the pipe 5 to be calibrated and form a conical inlet of the calibrating sleeve 9. For the further construction of the calibrating sleeve 9, reference is made to DE 2005 002 820 B3, the relevant disclosure of which is hereby made the subject matter of these exemplary embodiments. This calibrating sleeve 9, in the same way as the other equipment of the extrusion line too, is suitable for making a dimensional change while production is in progress.

Figure 2:
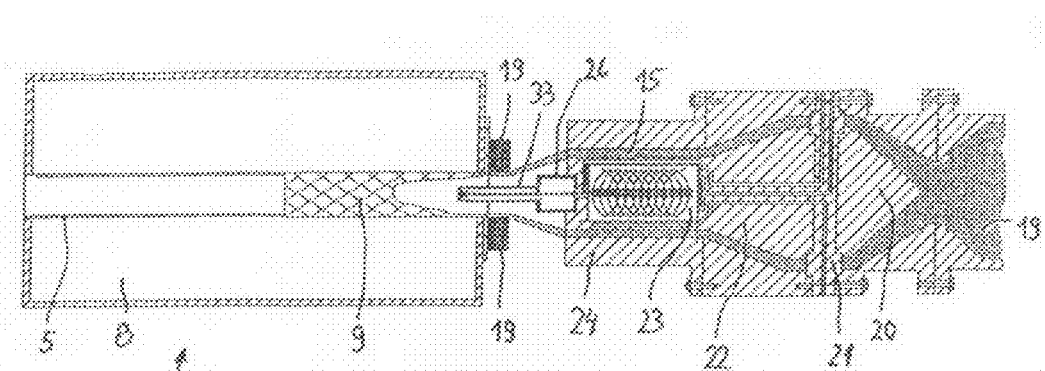
FIG. 2 shows an enlarged schematic detail A according to FIG. 1 in a sectional representation, in the case of a device in a first operating state.
Figure 3:
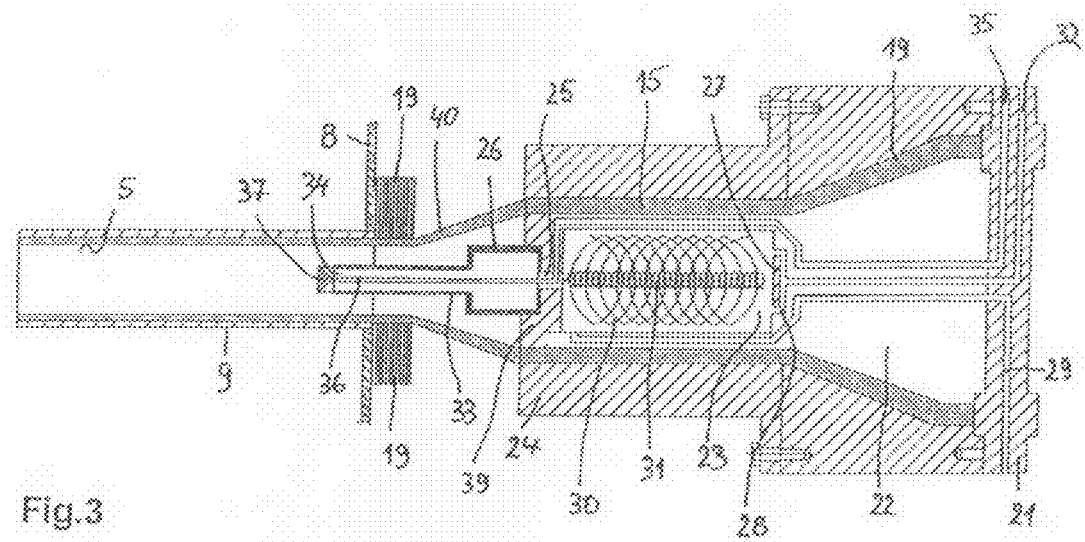
FIG. 3 shows an enlarged detail from FIG. 2.
Figure 4:
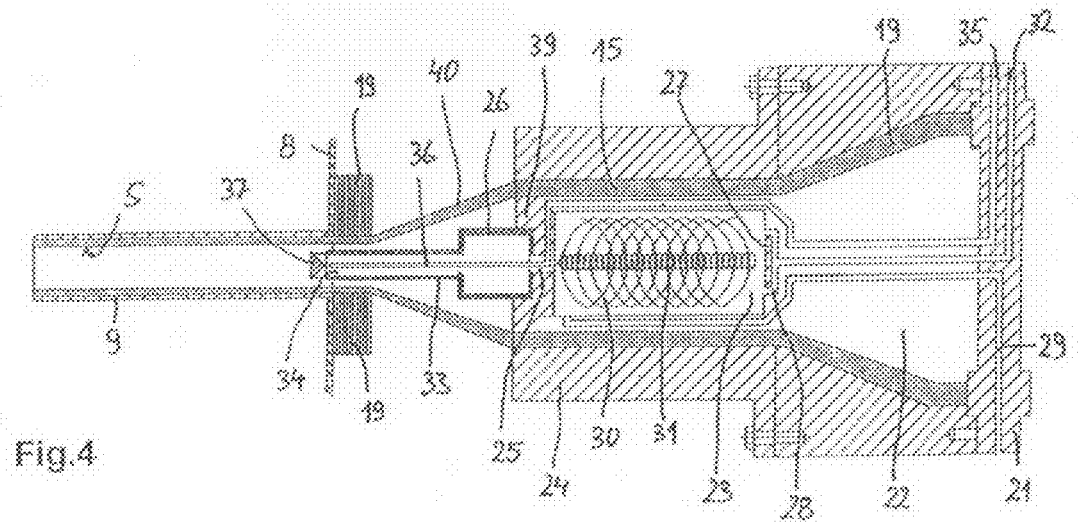
FIG. 4 shows a representation according to FIG. 3 in the case of a device in another operating state.

In the front end of the pipe extrusion head 3 that is shown in FIGS. 2 to 4, the polymer melt 41 conveyed by the extruder screw is divided in an annular manner. Provided for this purpose is a mandrel support tip 20, which protrudes conically into the stream of polymer melt 41. The mandrel support tip 20 is adjoined by a mandrel support spider plate 21, by means of which a mandrel 22 of the pipe extrusion head 3 is connected to the mandrel support tip 20 by screwing. The mandrel 22 goes over at its front end into a hollow cylinder 23, in the region of which the mandrel 22 is surrounded by a hollow-cylindrical die ring 24 while leaving the annular gap 15, said die ring being connected to the mandrel 22 by screwing. The annular gap 15 continues through the mandrel 22 to the mandrel support tip 20. In the mandrel support spider plate 21, the annular gap 15 is interrupted every 90 degrees by webs of material (not represented), which however do not disturb the flow of the polymer melt 41.

The hollow cylinder 23 is closed at its front end by a diaphragm 39, which has a central outlet opening 25, which opens out into a collecting chamber 26. At the opposite extreme end of the hollow cylinder 23, a diaphragm 27 is likewise provided, leaving an annular outlet opening 28 at its circumference. Arranged in the mandrel support spider plate 21 is an air supply bore 29, which is angled away at right angles in relation to the mandrel 22 in the vicinity of the centre axis of the mandrel 22, and is continued in the latter to the front end of the hollow cylinder 23. There, the air supply bore 29 opens out tangentially into the hollow cylinder 23. On account of this tangential introduction of air and the outlets 25 and 28, the hollow cylinder 23 acts as a Ranque vortex tube. This is supplied with compressed air at a pressure of approximately 7 bar and a temperature of about 20° C. by means of the air supply bore 29.

On account of this air supply into the hollow cylinder 23, two air flows form in the latter: a hot air flow 30 at the wall of the hollow cylinder 23 and a cold air flow 31 in the vicinity of the centre axis of the mandrel 22. The hot air flow 30 leaves the hollow cylinder 23 via the outlet opening 28 and flows from there via an air discharge bore 32, which continues in the mandrel support spider plate 21. The hot air flow 30 has a temperature of up to 110° C. The temperature of the cold air flow 31 is approximately 0° C. to 5° C. and flows via the outlet opening 25 into the collecting chamber 26. From the collecting chamber 26, the cooling air flows into a cooling tube 33, which extends as an axial extension of the mandrel 22 through the segments 19, i.e. through the inlet of the calibrating sleeve 9, and has a cooling air outlet 34 opening out into the calibrating sleeve 9. The cooling air 31 flowing out from the cooling tube 33 cools the extruded pipe 5 on its inner side in a very effective way in addition to the exterior cooling taking place in the vacuum tank 8. In order to prevent heating of the cooling air 31 on its way into the calibrating sleeve 9, the collecting chamber 26 and the cooling tube 33 are insulated.

To make the cooling more intensive, water is mixed with the cooling air 31 flowing out from the cooling tube 33. For this purpose, a water supply bore 35 is provided, extending through the mandrel support spider plate 21 and the mandrel 22 into the front diaphragm 39 of the hollow cylinder 23 and going over there into a thin pipeline 36, which runs centrally through the collecting chamber 26 and the cooling tube 33 and ends at the cooling air outlet 34.

In order to bring the moist cooling air flow effectively into the region of the inner wall of the extruded pipe 5, a corresponding air directing device 37 is provided ahead of the cooling air outlet 34, and in this exemplary embodiment is configured as a cone.

FIG. 3 shows the production of a pipe 5 with a large diameter, FIG. 4 shows the production of a pipe 5 with a small diameter. A comparison of the two representations shows that the cooling tube 33 and the collecting chamber 26 neither hinder the segments 19 in their radial adjustability nor adversely affect the melt cone 40 formed between the pipe extrusion head 3 and the calibrating sleeve 19.

Figure 5:
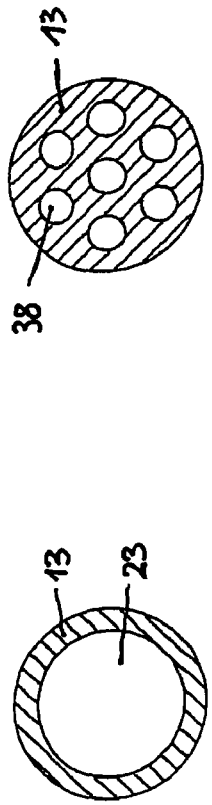
FIG. 5 shows a schematic cross section through the mandrel of an extruder head in a first embodiment of a Ranque vortex chamber.
Figure 6:
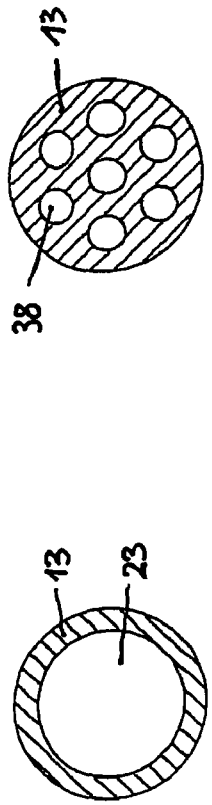
FIG. 6 shows a representation according to FIG. 5 in a second embodiment of the Ranque vortex chamber.

In FIGS. 5 and 6, two exemplary embodiments of how Ranque vortex tubes are formed in the mandrel 22 are shown.

The example shown in FIG. 5 corresponds to the exemplary embodiment explained above according to FIGS. 2 to 4. Here the mandrel 22 has been drilled with a bore of large diameter, so that the hollow cylinder 23 formed as a result acts as the one and only Ranque vortex tube. In this case, the collecting chamber 26 represented in FIGS. 2 to 4 is not absolutely necessary, i.e. the cooling tube 33 may directly adjoin the outlet opening 25.

In the exemplary embodiment according to FIG. 6, seven bores 38 of smaller diameter have been made in the front region of the mandrel 22 and each of the seven bores 38 acts independently as a Ranque vortex tube. In other words, there is a plurality of vortex tubes. Each vortex tube then has of course its own tangential air supply and its own outlet openings for the cold and warm air flows, the outlets for the cold air opening out into the collecting chamber 26.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

The invention claimed is:

1. Device for extruding hollow strands from thermoplastic material, comprising:
   a) an extruder head having a mandrel, and a calibrating device, for making a dimensional change while production is in progress, and with a radially adjustable inlet; and
   b) at least one Ranque vortex chamber being formed in the mandrel, a cooling air outlet of which at least one Ranque vortex chamber leads into a cooling tube, which cooling tube extends as an axial extension of the mandrel through the inlet of the calibrating device and which cooling tube has a cooling air outlet opening out into the calibrating device.

2. Device according to claim 1, wherein:
   a) a plurality of vortex chambers of the at least one Ranque vortex chamber are arranged in the mandrel, the cooling air outlets of which plurality of vortex chambers open out into a collecting chamber, from which the cooling tube extends.

3. Device according to claim 2, wherein:
   a) the cooling tube and the collecting chamber are insulated.

4. Device according to claim 1, wherein:
   a) the cooling air outlet of the vortex chamber opens out into a collecting chamber, from which the cooling tube extends; and
   b) the cooling tube and the collecting chamber are insulated.

5. Device according to claim 4, wherein:
   a) a directing device for diverting the cooling air stream to the inner wall of the extruded hollow strand is arranged ahead of the cooling air outlet of the cooling tube.

6. Device according to claim 2, wherein:
   a) a directing device for diverting the cooling air stream to the inner wall of the extruded hollow strand is arranged ahead of the cooling air outlet of the cooling tube.

7. Device according to claim 6, wherein:
   a) a water supply line opens out into the cooling air outlet of the cooling tube.

8. Device according to claim 5, wherein:
   a) a water supply line opens out into the cooling air outlet of the cooling tube.

* * * * *